(12) United States Patent
Radke et al.

(10) Patent No.: US 9,037,842 B2
(45) Date of Patent: *May 19, 2015

(54) BOOTING IN SYSTEMS HAVING DEVICES COUPLED IN A CHAINED CONFIGURATION

(71) Applicant: Micron Technology, Inc, Boise, ID (US)

(72) Inventors: William H Radke, Los Gatos, CA (US); Victor Y Tsai, Palo Alto, CA (US); Peter Feeley, Boise, ID (US); Neal A Galbo, Boca Raton, FL (US); Robert N Leibowitz, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/034,852

(22) Filed: Sep. 24, 2013

(65) Prior Publication Data

US 2014/0025943 A1 Jan. 23, 2014

Related U.S. Application Data

(63) Continuation of application No. 13/559,162, filed on Jul. 26, 2012, now Pat. No. 8,543,802, and a continuation of application No. 12/545,689, filed on Aug. 21, 2009, now Pat. No. 8,245,024.

(51) Int. Cl.
G06F 9/24 (2006.01)
G06F 9/00 (2006.01)
G06F 3/00 (2006.01)
G06F 9/44 (2006.01)

(52) U.S. Cl.
CPC ............ G06F 9/4411 (2013.01); G06F 9/4401 (2013.01)

(58) Field of Classification Search
CPC ...................................... G06F 9/4401
USPC ............................................ 713/2
See application file for complete search history.

(56) References Cited

U.S. PATENT DOCUMENTS

| | | | |
|---|---|---|---|
| 5,450,576 A | 9/1995 | Kennedy |
| 5,659,748 A | 8/1997 | Kennedy |
| 5,812,821 A | 9/1998 | Sugi et al. |
| 5,835,784 A | 11/1998 | Gillespie et al. |
| 6,105,130 A | 8/2000 | Wu et al. |
| 6,301,657 B1 | 10/2001 | Jones et al. |
| 6,370,645 B1 | 4/2002 | Lee |
| 6,430,687 B1 | 8/2002 | Aguilar et al. |
| 6,665,742 B2 | 12/2003 | Owen et al. |
| 6,816,750 B1 | 11/2004 | Klaas |
| 7,006,377 B2 | 2/2006 | Oh |
| 7,024,551 B2 | 4/2006 | King et al. |
| 7,032,106 B2 | 4/2006 | Horanzy et al. |
| 7,073,013 B2 | 7/2006 | Lasser |
| 7,222,230 B2 | 5/2007 | Hsu |
| 7,234,052 B2 | 6/2007 | Lee et al. |
| 7,237,105 B2 | 6/2007 | Fujita et al. |
| 7,284,084 B2 | 10/2007 | Atherton et al. |

(Continued)

*Primary Examiner* — Suresh Suryawanshi
(74) *Attorney, Agent, or Firm* — Brooks, Cameron & Huebsch, PLLC

(57) ABSTRACT

The present disclosure includes methods, devices, and systems for booting in systems having devices coupled in a chained configuration. One or more embodiments include a host and a number of devices coupled to the host in a chained configuration, wherein at least one of the number of devices is a bootable device and the at least one bootable device is not directly coupled to the host.

17 Claims, 3 Drawing Sheets

(56) References Cited

U.S. PATENT DOCUMENTS

| | | |
|---|---|---|
| 7,296,143 B2 | 11/2007 | Gaskins et al. |
| 7,444,543 B2 | 10/2008 | Babudri et al. |
| 7,467,417 B2 | 12/2008 | Stillerman et al. |
| 7,493,484 B2 | 2/2009 | Lee |
| 7,496,719 B2 | 2/2009 | Peterson et al. |
| 7,908,451 B2 | 3/2011 | Larson |
| 7,953,913 B2 | 5/2011 | Perry et al. |
| 8,166,268 B2 | 4/2012 | Larson |
| 2003/0233533 A1 | 12/2003 | Avraham |
| 2005/0165955 A1 | 7/2005 | Wakelin et al. |
| 2005/0268077 A1 | 12/2005 | Kuan et al. |
| 2006/0010282 A1 | 1/2006 | Kim |
| 2006/0064575 A1 | 3/2006 | Jo |
| 2006/0075395 A1 | 4/2006 | Lee et al. |
| 2006/0143368 A1 | 6/2006 | Lasser et al. |
| 2006/0179302 A1 | 8/2006 | Hatakeyama |
| 2006/0245274 A1 | 11/2006 | Choi et al. |
| 2007/0028083 A1 | 2/2007 | Yu et al. |
| 2007/0028084 A1 | 2/2007 | Yu et al. |
| 2007/0113067 A1 | 5/2007 | Oh et al. |
| 2007/0180223 A1 | 8/2007 | Tanaka |
| 2007/0192529 A1 | 8/2007 | Roh et al. |
| 2007/0220247 A1 | 9/2007 | Lee et al. |
| 2007/0233955 A1 | 10/2007 | Luo et al. |
| 2007/0250693 A1 | 10/2007 | Lin et al. |
| 2007/0253384 A1 | 11/2007 | Kanagala et al. |
| 2007/0254710 A1 | 11/2007 | Kanagala et al. |
| 2007/0260869 A1 | 11/2007 | Dade et al. |
| 2007/0283140 A1 | 12/2007 | Jones et al. |
| 2008/0040596 A1 | 2/2008 | Mai et al. |
| 2008/0040598 A1 | 2/2008 | Lee et al. |
| 2008/0046711 A1 | 2/2008 | Tung et al. |
| 2008/0082814 A1 | 4/2008 | Kuo et al. |
| 2008/0086631 A1 | 4/2008 | Chow et al. |
| 2008/0098164 A1 | 4/2008 | Lee et al. |
| 2008/0215870 A1 | 9/2008 | Liew |
| 2009/0055639 A1 | 2/2009 | Kuusilinna et al. |
| 2010/0042750 A1 | 2/2010 | Tsai et al. |
| 2010/0115191 A1 | 5/2010 | Hampel et al. |
| 2011/0276748 A1 | 11/2011 | Toyama et al. |

BOOTING IN SYSTEMS HAVING DEVICES COUPLED IN A CHAINED CONFIGURATION

PRIORITY APPLICATION INFORMATION

This application is a Continuation of U.S. application Ser. No. 13/559,162, filed Jul. 26, 2012, which is a Continuation of U.S. Pat. No. 8,245,024, filed Aug. 21, 2009 and issued Aug. 14, 2012, the specifications of which are incorporated herein by reference.

TECHNICAL FIELD

The present disclosure relates generally to semiconductor memory devices, methods, and systems, and more particularly, to booting in systems having devices coupled in a chained configuration.

BACKGROUND

Memory devices are typically provided as internal, semiconductor, integrated circuits and/or external removable devices in computers, personal digital assistants (PDAs), digital cameras, and cellular telephones, among various other electronic devices. There are many different types of memory including random-access memory (RAM), read only memory (ROM), dynamic random access memory (DRAM), synchronous dynamic random access memory (SDRAM), phase change random access memory (PCRAM), and flash memory, among others.

Various types of memory can be used in memory systems. The various types of memory can be used in various combinations to provide memory for a host. For example, flash memory can be included in a memory system. Flash memory can be part of a memory system as internal memory or as removable memory that can be coupled to the memory system through an interface, such as a USB connection, for example.

A memory system can include a host, such as a computer, and an external memory device having a direct connection to the host. The external memory device can include the system boot code used responsive to a booting event of the memory system. Responsive to a booting event of the memory system, the boot code, e.g., data representing the boot code, can be loaded from the external memory device to the host processor via the direct connection.

DETAILED DESCRIPTION

Figure 1:
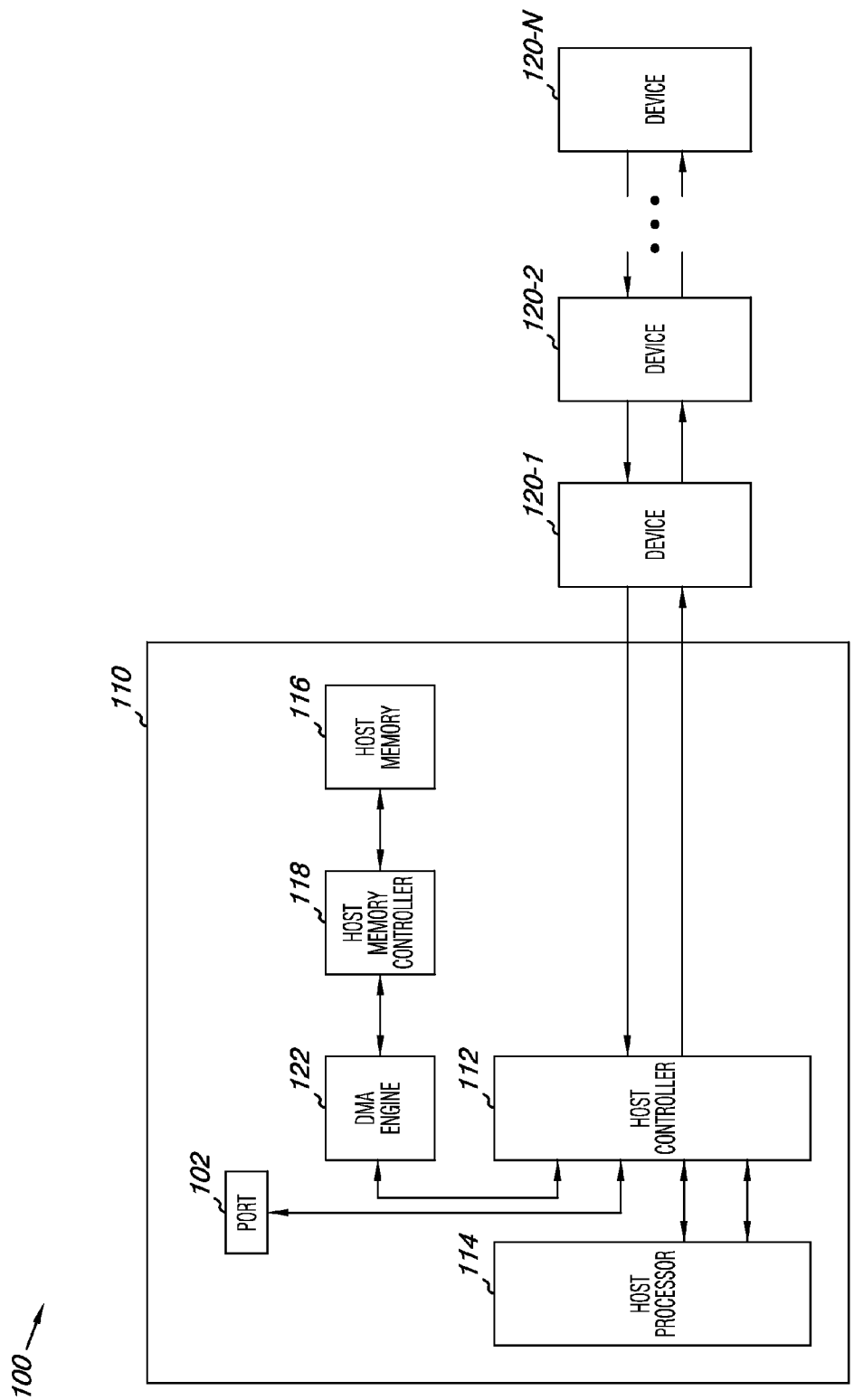
FIG. 1 illustrates a block diagram of a memory system in accordance with a number of embodiments of the present disclosure.

The present disclosure includes methods, devices, and systems for booting in systems having devices coupled in a chained configuration. One or more embodiments include a host and a number of devices coupled to the host in a chained configuration, wherein at least one of the number of devices is a bootable device and the at least one bootable device is not directly coupled to the host.

Embodiments of the present disclosure can reduce the number of instructions and/or commands from a host during configuration of, access of, and/or communication with a bootable device, e.g., a device which contains boot code, located in a chain of devices coupled to the host in a chained configuration. Reducing the number of instructions and/or commands from the host can, for example, increase the speed of and/or reduce the amount of power used responsive to a booting event of the host and devices in the chain, among other benefits.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As used herein, "a number of" something can refer to one or more such things. For example, a number of memory devices can refer to one or more memory devices. Additionally, the designator "N," as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, 112 may reference element "12" in FIG. 1, and a similar element may be referenced as 212 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure, and should not be taken in a limiting sense.

FIG. 1 illustrates a block diagram of a memory system 100 in accordance with a number of embodiments of the present disclosure. As shown in FIG. 1, memory system 100 includes host 110 and devices 120-1, 120-2, . . . , 120-N. Devices 120-1, 120-2, . . . , 120-N can be memory or non-memory devices. For example, devices 120-1, 120-2, . . . , 120-N can be DRAM or flash memory devices (e.g., NOR and/or NAND flash memory device), printers, scanners, cameras, or wireless communication devices (e.g., a Bluetooth or WiFi device), among various other memory and non-memory devices.

As shown in FIG. 1, host 110 includes port 102, host controller 112, host processor 114, host memory 116, host memory controller 118, and direct memory access (DMA) engine 122. One of skill in the art will appreciate that host processor 114 can include a number of processors, such as a parallel processing system, a number of coprocessors, etc. Host 110 can also include additional elements, e.g., additional computing device elements, not shown in FIG. 1, as will be understood by one of skill in the art.

Host 110 can be a computing device, such as a personal computer, among other computing device types. Examples of host 110 include laptop computers, personal computers, mobile phones, digital cameras, digital recording and play back devices, PDA's, memory card readers, and interface hubs, among other examples. Host 110 can include a single monolithic chip, multiple chips in a single package and/or module, and/or a combination of packages and/or modules on a printed circuit board.

As shown in FIG. 1, host controller 112 is coupled to port 102 and host processor 114. Host controller 112 is also coupled to host memory 116 via DMA engine 122 and host memory controller 118. Although host memory 116 is shown as being located within host 110, embodiments of the present disclosure are not so limited. For example, host memory 116 can be separate from, e.g., located outside of, host 110, and/or can be located within devices 120-1, 120-2, . . . , 120-N. In both of the examples above, host memory 116 can be considered "associated with" host 110.

Port 102 can be a hardware port. A hardware port can be used to couple a hardware device to host 110. For example, a hardware port can be used to couple a peripheral device, such as a digital camera, an MP3 player, a network device, and/or USB device, among other devices, to host 110. A hardware port can also be used to couple a media codec to host 110 for play-back of audio and/or video. The coupling of a hardware device to host 110 via port 102 can allow the hardware device to communicate with devices 120-1, 120-2, . . . , 120-N, host memory 116, and/or other memory in host 110. Communication can include, for example, reading, writing, and/or erasing data to and/or from the hardware devices, the devices, and/or the memory on or coupled to host 110.

As shown in FIG. 1, devices 120-1, 120-2, . . . , 120-N are coupled to host 110, e.g., host controller 112, in a chained configuration. Devices coupled to a host, e.g., host 110, in a chained configuration can be communicatively coupled to the host via the same interface port of the host, e.g., via the same interface port of host controller 112. A particular host interface port can include a data input port and a data output port. As such, information, e.g., data, can be communicated between host 110 and devices 120-1, 120-2, . . . , 120-N via the same single interface port of host 110, as will be further described herein.

The chained configuration shown in FIG. 1 includes a first device, e.g., device 120-1, directly coupled to host 110, a second device, e.g., device 120-2, directly coupled to the first device, a third device (not shown) directly coupled to the second device, . . . , and an Nth device, e.g., device 120-N, directly coupled to an N–1th device (not shown). A chained configuration of devices, such as the chained configuration shown in FIG. 1, can allow for point to point signaling, and can be arbitrarily long without the need for complex addressing circuitry. In a number of embodiments, devices 120-1, 120-2, . . . , 120-N can be coupled to a bus (not shown), and the last device in the chain, e.g., device 120-N, can be removed from the chain.

When an element is referred to as being "directly coupled" to another element, there are no intervening elements present between the two elements. In contrast, when an element is referred to as being "coupled" to another element, a number of intervening elements may be present between the two elements. For example, with reference to FIG. 1, device 120-2 can be considered to be coupled to host 110 via device 120-1. However, device 120-2 is not directly coupled to host 110, because device 120-1 is an intervening element present between device 120-2 and host 110. In contrast, device 120-1 is directly coupled to host 110, because no intervening elements are present between device 120-1 and host 110.

Host controller 112 can be used to communicate information between host 110 and devices 120-1, 120-2, . . . , 120-N. For example, host controller can be coupled to implement a standardized interface (not shown) for passing control, address, data, instructions, commands, and other signals between host 110, e.g., host processor 114, and devices 120-1, 120-2, . . . , 120-N. Additionally, when devices 120-1, 120-2, . . . , 120-N are used for data storage for memory system 100, host controller 112 can implement a serial advanced technology attachment (SATA), a peripheral component interconnect express (PCIe), a universal serial bus (USB), a small computer system interface (SCSI), and/or a universal flash storage (UFS), among other interfaces.

As shown in FIG. 1, information can be communicated between host 110 and devices 120-1, 120-2, . . . , 120-N in both a downstream and an upstream manner, e.g., direction. During a downstream communication, information is communicated away from host 110, e.g., from host 110 to devices 120-1, 120-2, . . . , 120-N, and during an upstream communication information is communicated toward host 110, e.g., from devices 120-1, 120-2, . . . , 120-N to host 110.

For example, during a downstream communication, host controller 112 can send information from host 110 to the first device in the chain, e.g., device 120-1. Device 120-1 can then send the information to the next downstream device in the chain, e.g., device 120-2. Device 120-2 can then send the information to the next downstream device in the chain (not shown), and the information can continue to be sent downstream in the chain until it reaches the last device in the chain, e.g., device 120-N. However, in a number of embodiments, information may not be sent to all the devices in the chain during a downstream communication, e.g., a device in the chain may receive information from an upstream device, but may not send the information further downstream. For example, device 120-2 may receive information from device 120-1, but may not send the information further downstream to devices that are downstream from device 120-2.

During an upstream communication, for example, the last device in the chain, e.g., device 120-N, can send information to the next upstream device in the chain (not shown), and the information can continue to be sent upstream in the chain until it reaches host 110. However, embodiments of the present disclosure are not so limited, and an upstream communication can begin at any device in the chain, e.g., not all devices in the chain may be involved in an upstream communication. For example, in an upstream communication which begins at device 120-2, device 120-2 can send information to device 120-1, and device 120-1 can then send the information to host 110. In such embodiments, devices located downstream from the device that initiates the upstream communication will not be involved in the upstream communication, e.g., will not receive the information included in the upstream communication.

Devices 120-1, 120-2, . . . , 120-N can include upstream and downstream input and output ports (not shown) for use during downstream and upstream communication. For example, during a downstream communication, device 120-1 can receive information from host 110 through an upstream input port, and can send the information to device 120-2 through a downstream output port. During an upstream communication, for example, device 120-1 can receive information from device 120-2 through a downstream input port, and can send the information to host 110 through an upstream output port.

Devices 120-1, 120-2, . . . , 120-N can be configured as pass-through devices, bootable devices, and/or off devices. The devices can be pre-configured during manufacturing, and/or can be re-configured during operation of memory system 100, by means of register settings in memory, e.g., non-volatile memory, located in the devices (not shown). The configuration of the devices can indicate the behavior of the devices responsive to an event of memory system 100, as will be further described herein. In a number of embodiments, devices configured as bootable devices are not directly coupled to a host, e.g., host 110. For instance, in the embodiment illustrated in FIG. 1, device 120-1 is not a bootable device. In a number of embodiments, the device directly coupled to host 110, e.g., device 120-1, is a pass-through device.

A bootable device, as used herein, can be a device that includes boot code for a system. For example, a device in the chain shown in FIG. 1 that is configured as a bootable device can include boot code for memory system 100. Host 110 can use the boot code to boot memory system 100 responsive to an event of memory system 100. For example, host processor 114 can access and/or load the boot code, e.g., data representing the boot code, from the bootable device(s) in the chain through host controller 112 responsive to an event of memory system 100, as will be further described herein. As used herein, "an event" of a memory system can include a booting event of the memory system, such as a power-on and/or a reset of the memory system, among other examples.

A bootable device can be associated with a default device identifier, e.g., Device0. For instance, in a number of embodiments, a bootable device can be pre-configured or reconfigured with a default device identifier. The default device identifier can be known to host processor 114, and host processor 114 can use the default device identifier to identify and/or communicate with the bootable device(s) in the chain, e.g., to access and/or load the boot code from the bootable device(s) in the chain, responsive to an event of memory system 100. In a number of embodiments, host processor 114 can use the default device identifier to identify and/or communicate with the bootable device(s) in the chain before host processor 114 initiates an enumeration process, e.g., before host processor 114 assigns a device identifier to each device in the chain.

In a number of embodiments in which multiple devices in the chain are configured as bootable devices, a default device identifier can be associated with each bootable device. Additionally, one or more bootable devices can include the same boot code, and/or one or more bootable devices can include a different boot code, e.g., a different portion of boot code. Host processor 114 can access and/or load the bootable code from a number of the bootable devices, e.g., host processor 114 can access and/or load the boot code from one of the bootable devices, some of the bootable devices, or all of the bootable devices.

A pass-through device, as used herein, is a device that can automatically, e.g., without user input or intervention, send data and instructions, e.g., commands, received from the device in the chain directly coupled upstream from the pass-through device to the device in the chain directly coupled downstream from the pass-through device responsive to an event of memory system 100. A pass-through device can also automatically send data and instructions received from the device in the chain directly coupled downstream from the pass-through device to the device in the chain directly coupled upstream from the pass-through device responsive to an event of memory system 100. For example, in embodiments in which device 120-1 is a pass-through device, device 120-1 can automatically send data and instructions received from host 110 to device 120-2, and device 120-1 can also automatically send data and instructions received from device 120-2 to host 110 responsive to an event of memory system 100.

An off device, as used herein, is a device that will not send data or instructions, e.g., commands, received from the device in the chain directly coupled upstream from the off device to the device in the chain directly coupled downstream from the off device responsive to an event of memory system 100. Nor will an off device send data or instructions received from the device in the chain directly coupled downstream from the off device to the device in the chain directly coupled upstream from the off device responsive to an event of memory system 100. For example, in embodiments in which device 120-N is an off device, device 120-N will not send or receive data or instructions to or from device 120-(N−1) (not shown) responsive to an event of memory system 100.

In a number of embodiments, a bootable device in the chain can be configured to automatically, e.g., without user input or intervention, send the boot code, e.g., data representing the boot code, upstream through the chain of devices, e.g., through any upstream pass-through devices in the chain, to host 110 responsive to an event of memory system 100. For example, host processor 114 can pre-define a location (e.g., address), which could be just a tag of a location, in host memory 116 to which boot code is to be sent, and the bootable device can automatically send the boot code upstream through the chain of devices to the pre-defined location in host memory 116 responsive to an event of memory system 100. Host processor 114 can then access and/or load the boot code from the pre-defined location in host memory 116 through host controller 112.

In a number of embodiments, host processor 114 can execute an instruction, e.g., a specific data sequence, illegal line state, and/or reference clock, to send a boot command to devices 120-1, 120-2, . . . , 120-N through host controller 112 responsive to an event of memory system 100. The boot command can include a command for each bootable device(s) in the chain to send boot code to host 110. Each bootable device(s) in the chain can then send the boot code, e.g., data representing the boot code, upstream through the chain of devices, e.g., through any upstream pass-through devices in the chain, to host 110 responsive to receipt of the boot command. The boot command can also include, for example, a location (e.g., address), which could be just a tag of a location, in host memory 116 to which the bootable device(s) is to send the boot code, and the bootable device(s) can send the boot code to the location. Host processor 114 can then access and/or load the boot code from the location in host memory 116 through host controller 112.

In a number of embodiments in which a bootable device(s) in the chain is associated with a default device identifier, e.g., in which host processor 114 knows which device(s) in the chain is a bootable device(s), host processor 114 can execute an instruction to send a boot command to the bootable device(s) associated with the default device identifier through host controller 112 responsive to an event of memory system 100. The boot command can include the default device identifier and a command for the bootable device(s) associated with the default device identifier to send boot code to host 110. The bootable device(s) associated with the default device identifier can then send the boot code, e.g., data representing the boot code, upstream through the chain of devices, e.g., through any upstream pass-through devices in the chain, to host 110 responsive to receipt of the boot command. The boot command can also include, for example, a location (e.g., address), which could be just a tag of a location, in host memory 116 to which the bootable device(s) is to send the boot code, and the bootable device(s) can send the boot code to the location. Host processor 114 can then access and/or load the boot code from the location in host memory 116 through host controller 112. The boot command can also include the location (e.g., address), which could be just a tag of the location, in the bootable memory device(s) where the boot code is located, the amount, e.g., length, of data included in the boot code, and/or the location (e.g., address), which could just be a tag of the location, in host memory 116 where the command is located.

The embodiment illustrated in FIG. 1 can include additional circuitry that is not illustrated so as not to obscure embodiments of the present disclosure. For example, devices 120-1, 120-2, . . . , 120-N can include address circuitry to latch address signals provided over I/O connectors through I/O circuitry. Address signals can be received and decoded by a row decoder and a column decoder, to access devices 120-1, 120-2, . . . , 120-N. It will be appreciated by those skilled in the art that the number of address input connectors can depend on the density and architecture of devices 120-1, 120-2, . . . , 120-N.

Figure 2:
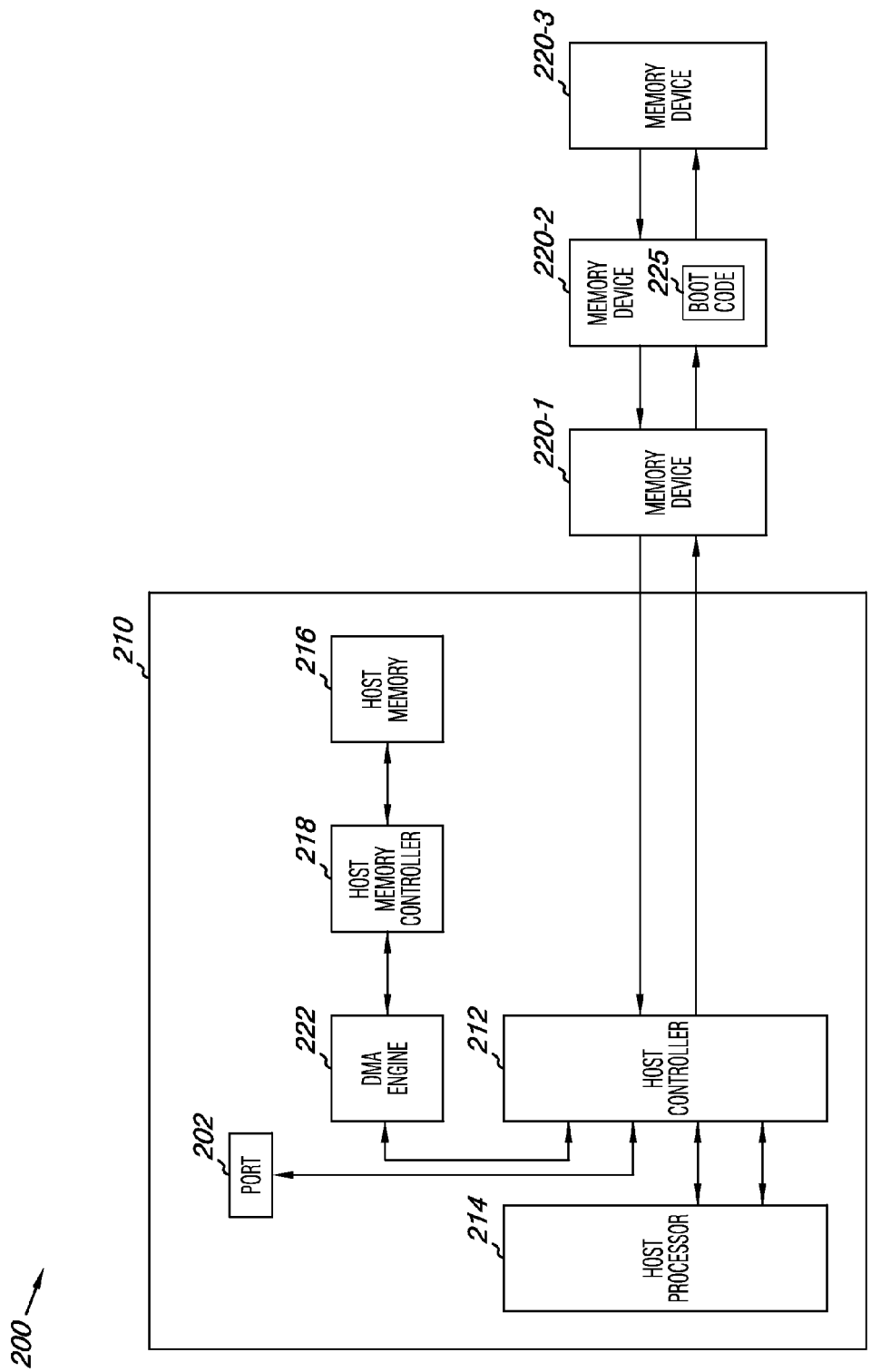
FIG. 2 illustrates a block diagram of a memory system in accordance with a number of embodiments of the present disclosure.

FIG. 2 illustrates a block diagram of a memory system 200 in accordance with a number of embodiments of the present disclosure. As shown in FIG. 2, memory system 200 includes host 210 and memory devices 220-1, 220-2, and 220-3. Host 210 can be analogous to host 110 shown in FIG. 1, and the elements included in host 210, e.g., port 202, host controller 212, host processor 214, host memory 216, host memory controller 218, and direct memory access (DMA) engine 222, can be analogous to the elements included in host 110, e.g., port 102, host controller 112, host processor 114, host memory 116, host memory controller 118, and DMA engine 122.

As shown in FIG. 2, memory devices 220-1, 220-2, and 220-3 are coupled to host 210, e.g., host controller 212, in a chained configuration. The chained configuration includes a first memory device, e.g., memory device 220-1, directly coupled to host 210, a second memory device, e.g., memory device 220-2, directly coupled to the first memory device, and a third memory device, e.g., memory device 220-3, directly coupled to the second device.

Host controller 212 can be used to communicate information between host 210, e.g., host processor 214, and memory devices 220-1, 220-2, and 220-3 in a manner analogous to that previously described in connection with FIG. 1. For example, information can be communicated between host 210 and memory devices 220-1, 220-2, and 220-3 in both a downstream and an upstream manner analogous to that previously described in connection with FIG. 1. Further, memory devices 220-1, 220-2, and 223 can include upstream and downstream input and output ports (not shown) for use during downstream and upstream communication, in a manner analogous to that previously described in connection with FIG. 1.

Memory devices 220-1, 220-2, and 220-3 can include a number of memory device controllers (not shown) that can be used to facilitate operations, such as read, write, and/or erase commands, among other operations, that are communicated to memory devices 220-1, 220-2, and 220-3 from host 210. The circuitry in the memory device controllers can include control circuitry for providing a translation layer between host 210 and memory devices 220-1, 220-2, and 220-3. Thus, a memory device controller could selectively couple an I/O connector (not shown) of memory devices 220-1, 220-2, and 220-3 to receive the appropriate signal at the appropriate I/O connection at the appropriate time. Similarly, the communication protocol between host 210 and memory devices 220-1, 220-2, and 220-3 may be different than what is required for access to memory devices 220-1, 220-2, and 220-3. The memory device controllers could then translate the command sequence received from host 210 into appropriate command sequences to achieve the desired access to memory devices 220-1, 220-2, and 220-3. Each translation may further include changes in signal voltage levels in addition to command sequences.

In the embodiment illustrated in FIG. 2, memory device 220-1 can be configured as a pass-through memory device, memory device 220-2 can be configured as a bootable memory device, and memory device 220-3 can be configured as a pass-through memory device or an off memory device. Configuring memory device 220-3 as an off memory device can reduce the power consumption of memory system 200 responsive to an event of memory system 200. As shown in FIG. 2, bootable memory device 220-2 includes boot code 225. Additionally, in a number of embodiments, bootable memory device 220-2 can be associated, e.g., pre-configured or reconfigured, with a default device identifier, e.g., Device0.

In a number of embodiments, bootable memory device 220-2 can be configured to automatically, e.g., without user input or intervention, send boot code 225, e.g., data representing boot code 225, upstream through pass-through memory device 220-1 to host 210 responsive to an event of memory system 200. That is, responsive to an event of memory system 200, bootable memory device 220-2 can send boot code 225 to pass-through memory device 220-1, and pass-through memory device 220-1 can then send boot code 225 to host 210. Additionally, host processor 214 can pre-define a location (e.g., address), which could be just a tag of a location, in host memory 216 to which boot code 225 is to be sent, and bootable memory device 220-2 can automatically send boot code 225 upstream through pass-through memory device 220-1 to the pre-defined location in host memory 216 responsive to an event of memory system 200. Host processor 214 can then access and/or load boot code 225 from the pre-defined location in host memory 216 through host controller 212.

In a number of embodiments, host processor 214 can execute an instruction, e.g., a specific data sequence, illegal line state, and/or reference clock, to send a boot command to memory devices 220-1, 220-2, and 220-3 through host controller 212 responsive to an event of memory system 200. The boot command can include a command for each bootable memory device(s) in the chain to send boot code to host 210. Bootable memory device 220-2 can then send boot code 225, e.g., data representing boot code 225, upstream through pass-through memory device 220-1 to host 210 responsive to receipt of the boot command. That is, responsive to receipt of the boot command, bootable memory device 220-2 can send boot code 225 to pass-through memory device 220-1, and pass-through memory device 220-1 can then send boot code 225 to host 210. The boot command can also include, for example, a location (e.g., address), which could just be a tag of a location, in host memory 216 to which each bootable memory device(s) in the chain is to send boot code, and bootable memory device 220-2 can send boot code 225 to the location. Host processor 214 can then access and/or load boot code 225 from the location in host memory 216 through host controller 212.

In a number of embodiments in which bootable memory device 220-2 is associated with a default device identifier, e.g., in which host processor 214 knows memory device 220-1 is a bootable memory device, host processor 214 can execute an instruction to send a boot command downstream to bootable memory device 220-2 through host controller 212 and pass-through memory device 220-1 responsive to an event of memory system 200. That is, host processor 214 can send the boot command to pass-through memory device 220-1 through host controller 212, and pass-through memory device 220-1 can then send the boot command to bootable memory device 220-2. The boot command can include the default device identifier and a command for bootable memory device 220-2 to send boot code 225 to host 210. Bootable memory device 220-2 can then send boot code 225, e.g., data representing boot code 225, upstream through pass-through memory device 220-1 to host 210 responsive to receipt of the boot command. That is, responsive to receipt of the boot command, bootable memory device 220-2 can send boot code 225 to pass-through memory device 220-1, and pass-through memory device 220-1 can then send boot code 225 to host 210. The boot command can also include, for example, a location (e.g., address), which could be just a tag of a location, in host memory 216 to which bootable memory device 220-2 is to send boot code 225, and bootable memory device 220-2 can send boot code 225 to the location. Host processor 214 can then access and/or load boot code 225 from the location in host memory 216 through host controller 212. The boot command can also include the location (e.g., address), which could be just a tag of the location, in bootable memory device 220-2 where boot code 225 is located, the amount, e.g., length, of data included in boot code 225, and/or the location (e.g., address), which could be just a tag of the location, in host memory 216 where the command is located.

The embodiment illustrated in FIG. 2 can include additional circuitry that is not illustrated so as not to obscure embodiments of the present disclosure. For example, memory devices 220-1, 220-2, and 220-3 can include address circuitry to latch address signals provided over I/O connectors through I/O circuitry. Address signals can be received and decoded by a row decoder and a column decoder, to access memory devices 220-1, 220-2, and 220-3. It will be appreciated by those skilled in the art that the number of address input connectors can depend on the density and architecture of memory devices 220-1, 220-2, and 220-3.

Figure 3:
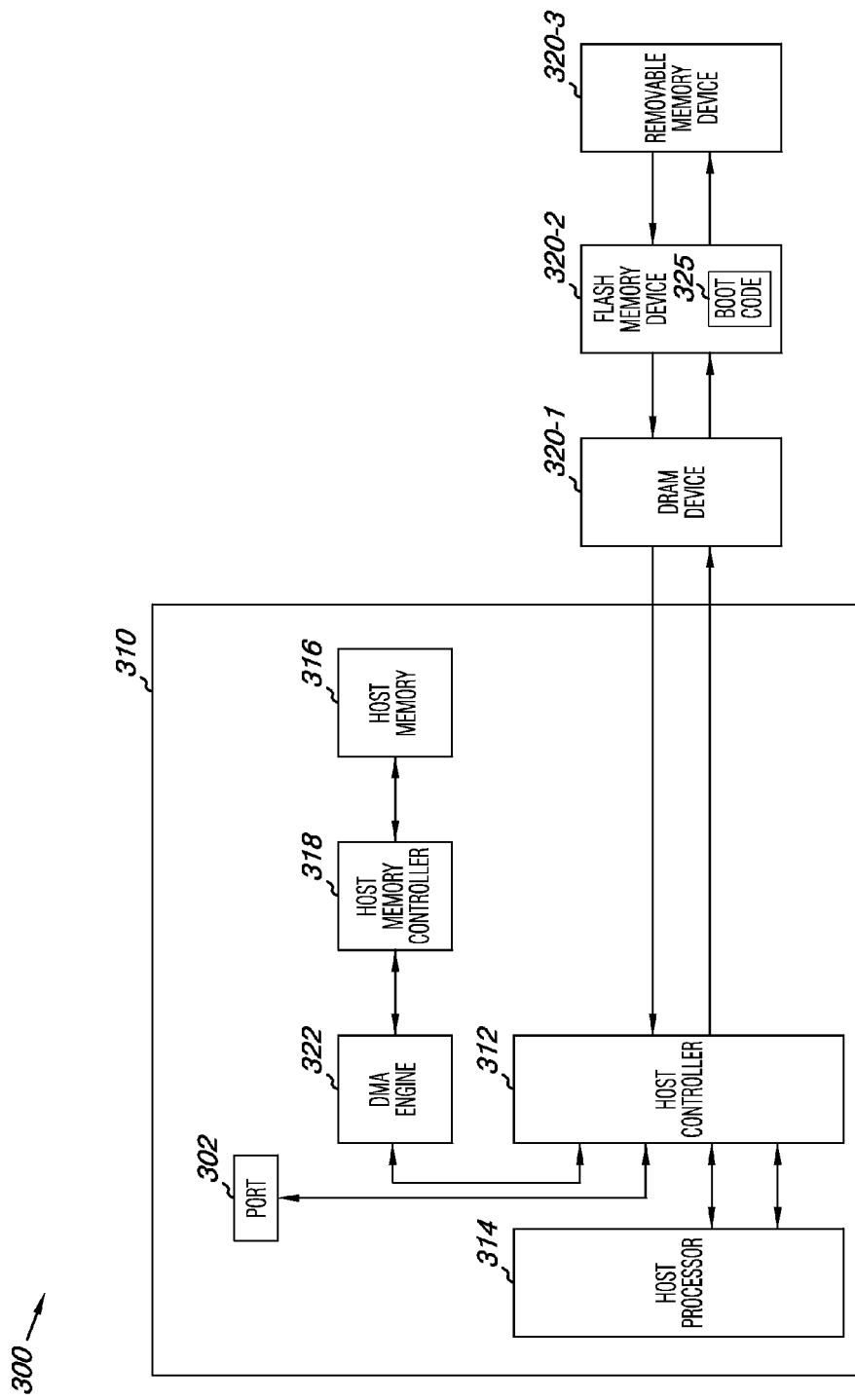
FIG. 3 illustrates a block diagram of a memory system in accordance with a number of embodiments of the present disclosure.

FIG. 3 illustrates a block diagram of a memory system 300 in accordance with a number of embodiments of the present disclosure. As shown in FIG. 3, memory system 300 includes host 310, dynamic random access memory (DRAM) device 320-1, flash memory device 320-2, and removable memory device 320-3. Host 310 can be analogous to hosts 110 and 210 shown in FIGS. 1 and 2, and the elements included in host 310, e.g., port 302, host controller 312, host processor 314, host memory 316, host memory controller 318, and direct memory access (DMA) engine 322, can be analogous to the elements included in host 110 and host 210, e.g., ports 102 and 202, host controllers 112 and 212, host processors 114 and 214, host memories 116 and 216, host memory controllers 118 and 218, and DMA engines 122 and 222. Flash memory device 320-2 can be, for example, a NAND flash memory device. Removable memory device 320-3 can be, for example, a peripheral memory device, such as such as a digital camera, an MP3 player, a network device, and/or USB device, among other removable memory devices.

As shown in FIG. 3, DRAM device 320-1, flash memory device 320-2, and removable memory device 320-3 are coupled to host 310, e.g., host controller 312, in a chained configuration analogous to the chained configuration previously described in connection with FIG. 2. For example, as shown in FIG. 3, the device directly coupled to host 310, e.g., the first device in the chain, is DRAM device 320-1. In a number of embodiments, DRAM device 320-1 can operate at a faster speed than flash memory device 320-2 and removable memory device 320-3. Hence, directly coupling DRAM device 320-1 to host 310, e.g., having DRAM device 320-1 be the first device in the chain, can increase the speed of an event of memory system 300.

Additionally, host controller 312 can be used to communicate information between host 310, e.g., host processor 314, and DRAM device 320-1, flash memory device 320-2, and removable memory device 320-3 in a manner analogous to that previously described in connection with FIG. 2. Further, DRAM device 320-1, flash memory device 320-2, and removable memory device 320-3 can include a number of memory device controllers (not shown) that can be used to facilitate operations, such as read, write, and/or erase commands, among other operations, that are communicated to the memory devices from host 310, as previously described in connection with FIG. 2.

In the embodiment illustrated in FIG. 3, DRAM device 320-1 can be configured as a pass-through DRAM device, flash memory device 320-2 can be configured as a bootable flash memory device, and removable memory device 320-3 can be configured as a pass-through removable memory device, a bootable removable memory device, or an off removable memory device. Configuring removable memory device 320-3 as an off removable memory device can reduce the power consumption of memory system 300 responsive to an event of system 300. As shown in FIG. 3, bootable flash memory device 320-2 includes boot code 325. Additionally, in a number of embodiments, bootable flash memory device 320-2 can be associated, e.g., pre-configured or reconfigured, with a default device identifier, e.g., Device0.

In a number of embodiments, bootable flash memory device 320-2 can be configured to automatically, e.g., without user input or intervention, send boot code 325, e.g., data representing boot code 325, upstream through pass-through DRAM device 320-1 to host 310 responsive to an event of memory system 300 in a manner analogous to that previously described in connection with FIG. 2. Additionally, in a number of embodiments host processor 314 can execute an instruction to send a boot command to pass-through DRAM device 320-1, bootable flash memory device 320-2, and removable memory device 320-3 through host controller 312 responsive to an event of memory system 300, and bootable flash memory device 320-2 can then send boot code 325, e.g., data representing boot code 325, upstream through pass-through DRAM device 320-1 to host 310 responsive to receipt of the boot command, in a manner analogous to that previously described in connection with FIG. 2.

Additionally, in a number of embodiments in which bootable flash memory device 320-2 is associated with a default device identifier, host processor 314 can execute an instruction to send a boot command downstream to bootable flash memory device 320-2 through host controller 312 and pass-through DRAM device 320-1 responsive to an event of memory system 300, and bootable flash memory device 320-2 can then send boot code 325, e.g., data representing boot code 325, upstream through pass-through DRAM device 320-1 to host 310 responsive to receipt of the boot command, in a manner analogous to that previously described in connection with FIG. 3.

The embodiment illustrated in FIG. 3 can include additional circuitry that is not illustrated so as not to obscure embodiments of the present disclosure, as previously described in connection with FIG. 2.

CONCLUSION

The present disclosure includes methods, devices, and systems for booting in systems having devices coupled in a chained configuration. One or more embodiments include a host and a number of devices coupled to the host in a chained configuration, wherein at least one of the number of devices is a bootable device and the at least one bootable device is not directly coupled to the host.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than, all features of a single disclosed embodiment. Thus, the following claims are hereby incorporated into the Detailed Description, with each claim standing on its own as a separate embodiment.

What is claimed is:

1. A device, comprising:
   boot code;
   wherein:
   the device is associated with a default device identifier identifying that the device includes the boot code;
   the device is configured to send the boot code to a host through a pass-through device directly coupled to the host; and
   the host knows the device is associated with the default device identifier identifying that the device includes the boot code before sending a boot command to the device.

2. The device of claim 1, wherein the device is configured to be coupled to the host via the pass-through device.

3. The device of claim 1, wherein the device is configured to automatically send the boot code to the host responsive to a booting event of the device.

4. The device of claim 1, wherein the device is configured to send the boot code to a pre-defined location in a memory of the host.

5. A method for operating a device, comprising:
   sending, via the device, boot code to a host;
   wherein:
   the device is associated with a default device identifier identifying that the device includes the boot code;
   the boot code is sent to the host through a number of pass-through devices, wherein one of the number of pass-through devices is directly coupled to the host; and
   the host knows the device is associated with the default device identifier identifying that the device includes the boot code before sending a boot command to the device.

6. The method of claim 5, wherein the method includes sending, via the device, the boot code to the host responsive to a power-on of the device.

7. The method of claim 5, wherein the method includes sending, via the device, the boot code to the host responsive to a reset of the device.

8. The method of claim 5, wherein the number of pass-through devices is a plurality of pass-through devices.

9. A system, comprising:
   a host; and
   a plurality of devices coupled to the host, wherein:
   one of the plurality of devices is a bootable device;
   the bootable device is associated with a default device identifier identifying that the bootable device includes boot code for the system;
   the host is aware of which one of the plurality of devices is the bootable device before sending a boot command to any of the plurality of devices;
   the host is aware the bootable device is associated with the default device identifier identifying that the bootable device includes the boot code for the system before sending a boot command to any of the plurality of devices; and
   a different one of the plurality of devices is a pass-through device directly coupled to the host.

10. The system of claim 9, wherein the bootable device is directly coupled to the pass-through device.

11. The system of claim 9, wherein the bootable device is not directly coupled to the host.

12. The system of claim 9, wherein:
   the host is configured to send a boot command to the bootable device; and
   the bootable device is configured to send boot code to the host responsive to receiving the boot command.

13. A method for operating a system, comprising:
   sending a boot command from a host to a pass-through device directly coupled to the host; and
   sending the boot command from the pass-through device to a device that includes boot code for the system and is associated with a default device identifier identifying that the device includes the boot code for the system;
   wherein the host is aware the device is associated with the default device identifier identifying that the device includes the boot code for the system before sending the boot command to the pass-through device.

14. The method of claim 13, wherein the method includes:
   sending the boot code for the system from the device that includes the boot code to the pass-through device; and
   sending the boot code from the pass-through device to the host.

15. The method of claim 13, wherein the boot command includes a command for the device that includes the boot code for the system to send the boot code to the host.

16. The method of claim 13, wherein the boot command includes a location of the boot code for the system in the device that includes the boot code.

17. The method of claim 13, wherein the boot command includes an amount of data included in the boot code for the system.

* * * * *